(12) United States Patent
Vincent

(10) Patent No.: US 9,066,467 B1
(45) Date of Patent: Jun. 30, 2015

(54) SOIL TREATMENT APPLICATOR

(71) Applicant: Gene Thomas Vincent, Tomball, TX (US)

(72) Inventor: Gene Thomas Vincent, Tomball, TX (US)

( * ) Notice: Subject to any disclaimer, the term of this patent is extended or adjusted under 35 U.S.C. 154(b) by 0 days.

(21) Appl. No.: 14/224,938

(22) Filed: Mar. 25, 2014

Related U.S. Application Data

(60) Provisional application No. 61/814,475, filed on Apr. 22, 2013.

(51) Int. Cl.
| | | |
|---|---|---|
| *A01G 27/00* | (2006.01) | |
| *A01C 23/04* | (2006.01) | |
| *A01M 7/00* | (2006.01) | |
| *A01G 25/16* | (2006.01) | |
| *A01G 25/00* | (2006.01) | |
| *B05B 12/00* | (2006.01) | |
| *B05B 7/24* | (2006.01) | |
| *B05B 1/14* | (2006.01) | |

(52) U.S. Cl.
CPC ............ *A01C 23/042* (2013.01); *A01M 7/0092* (2013.01); *A01G 25/16* (2013.01); *A01G 25/00* (2013.01); *B05B 12/00* (2013.01); *B05B 7/2443* (2013.01); *B05B 1/14* (2013.01)

(58) Field of Classification Search
CPC ... A01C 23/042; A01M 7/0092; A01G 25/16; A01G 25/00; B05B 12/00; B05B 7/2443; B05B 1/14
USPC .................... 239/69, 201, 203, 207, 310, 565
See application file for complete search history.

(56) References Cited

U.S. PATENT DOCUMENTS

| | | | | |
|---|---|---|---|---|
| 4,545,396 A * | 10/1985 | Miller et al. | .................. | 239/310 |
| 6,685,104 B1 * | 2/2004 | Float et al. | .................... | 239/201 |
| 6,932,277 B1 * | 8/2005 | Ericksen et al. | ................. | 239/69 |
| 7,264,177 B2 * | 9/2007 | Buck et al. | ....................... | 239/69 |

* cited by examiner

*Primary Examiner* — Steven J Ganey
(74) *Attorney, Agent, or Firm* — Buskop Law Group, PC; Wendy Buskop

(57) ABSTRACT

A portable lightweight low pressure soil treatment applicator for home, lawn or garden irrigation systems with predefined areas of soil to be irrigated using a pressurized water supply and pressurized water for irrigation. The portable lightweight low pressure soil treatment applicator uses a liquid soil treatment solution that can be a liquid herbicide, a liquid pesticide, a liquid fertilizer, and combinations thereof.

11 Claims, 3 Drawing Sheets

FIGURE 3

| | |
|---|---|
| PROGRAMMABLE LOGIC CIRCUIT | 1 |
| GROUND FAULT INTERRUPTER | 106 |
| RELAY | 104 |
| PROCESSOR | 100 |
| DATA STORAGE | 102 |
| COMPUTER INSTRUCTIONS FOR ACTIVATING AND DEACTIVATING THE RELAY WHEN PRESSURIZED WATER IS DETECTED AT THE WATER INLET PORT | 108 |
| COMPUTER INSTRUCTIONS TO ADJUST FLOW RATES OF THE DILUTED PRESSURIZED LIQUID SOIL TREATMENT SOLUTION TO THE PRESSURIZED WATER FOR IRRIGATION | 109 |
| COMPUTER INSTRUCTIONS TO PROVIDE THE DILUTED PRESSURIZED LIQUID SOIL TREATMENT SOLUTION AT PRESET TIME INTERVALS TO THE PRESSURIZED WATER FOR IRRIGATION | 110 |
| COMPUTER INSTRUCTIONS TO CONNECT THE PROGRAMMABLE LOGIC CIRCUIT TO A NETWORK FOR CONTROLLING OPERATION OF THE PORTABLE LIGHTWEIGHT LOW PRESSURE SOIL TREATMENT APPLICATOR USING A CLIENT DEVICE IN COMMUNICATION WITH THE NETWORK | 112 |

SOIL TREATMENT APPLICATOR

CROSS REFERENCE TO RELATED APPLICATION

The current application claims priority to and the benefit of U.S. Provisional Patent Application Ser. No. 61/814,475 filed on Apr. 22, 2013, entitled "Applicator for Horticultural Chemicals; Fertilizer, Herbicide, and Pesticides." This reference is hereby incorporated in its entirety.

FIELD

The present embodiments generally relate to a reliable soil treatment applicator that ties into an existing pressurized water system, such as a home, lawn or garden sprinkler system.

BACKGROUND

A need exists for a reliable all in one unit for blending and controlling flow of soil treatment solutions which is automated and needs no human intervention.

The present embodiments meet these needs.

BRIEF DESCRIPTION OF THE DRAWINGS

The detailed description will be better understood in conjunction with the accompanying drawings as follows:

FIG. 3 is a diagram of the programmable logic circuit of the portable lightweight low pressure soil treatment applicator as connected to a network and a remote client device for remote control of the portable lightweight low pressure soil treatment applicator.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a reliable soil treatment applicator that ties into an existing pressurized water system, such as a home, lawn or garden sprinkler system.

A benefit of the invention is that the invention can prevent the deaths and serious illnesses that can come from viruses carried by mosquitoes and other insects through the invention's ability to apply pesticides, such as automatically which is provided by an embodiment of the invention.

Droughts have become increasingly prevalent in today's climates around the world, particularly in Texas, Arizona, California, and other populous states of the United States. Another benefit of the invention is that the invention can help conserve water by reducing the need to hire a third party to provide fertilizer and pesticide treatments by allowing a property owner to apply these chemicals through their existing irrigation system.

Chemical exposure through the application of fertilizers and pesticides is an increasing concern. A benefit of the invention is that it reduces the need for both dangerous chemical exposure and time-consuming human application of fertilizers and pesticides, thereby providing a property owner additional personal time in this time-constrained world.

Over-application of fertilizers and chemicals has further proven to be an issue in instances of contamination of water supplies and the surrounding environment. Yet another benefit of the invention is that the application of soil treatment chemicals can be better regulated as compared to a third party application company that will typically over-apply chemicals in order to extend the amount of time that the chemicals are effective. These over-applications can pose a threat to delicate species of insects and animals that are not the intended target of the applied chemicals.

Figure 1:
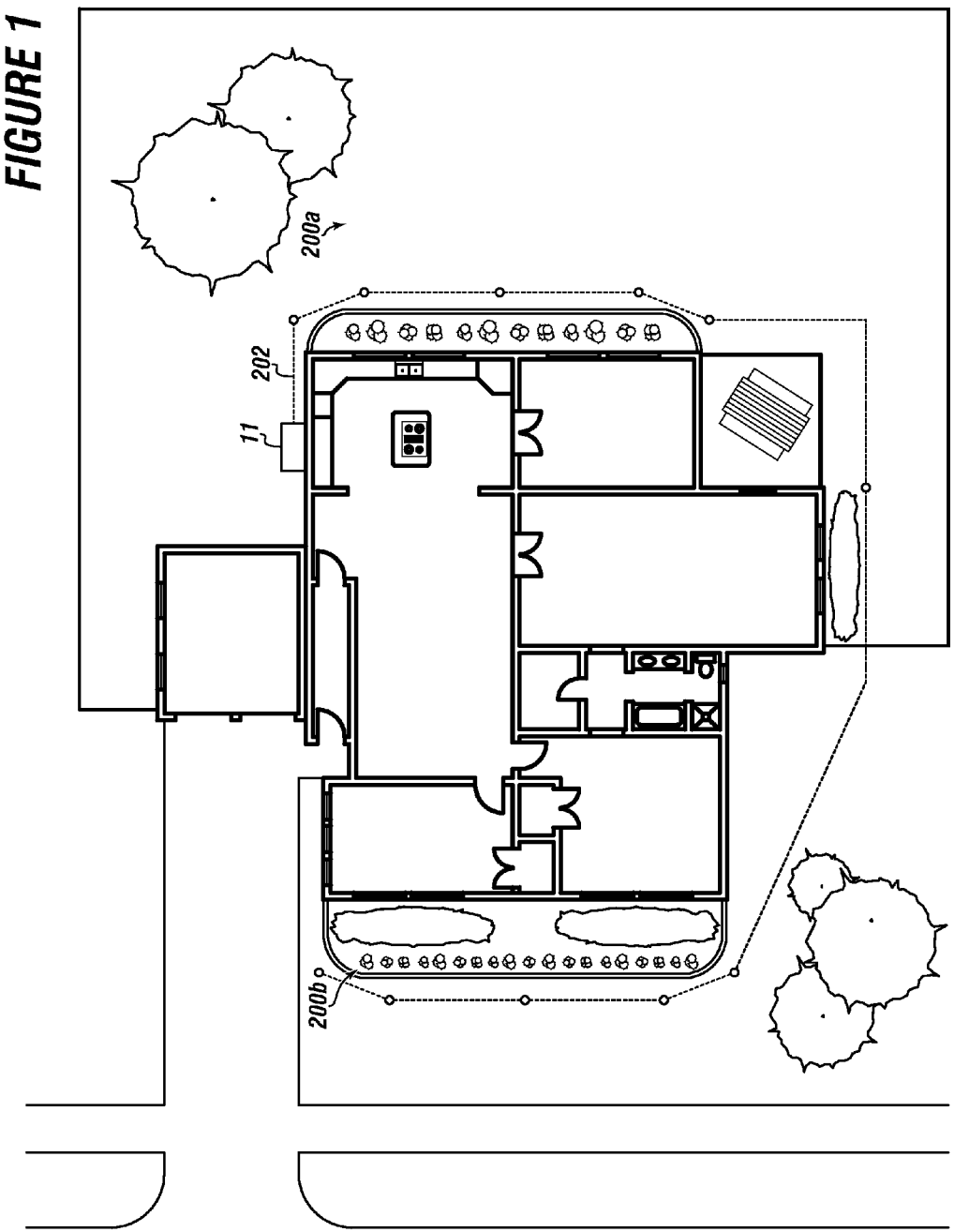
FIG. 1 is an overview of a house with a pressurized water supply system that is connected to a portable lightweight low pressure soil treatment applicator according to one or more embodiments.

Turning now to the Figures, FIG. 1 is an overview of a house with a pressurized water supply system that is connected to a portable lightweight low pressure soil treatment applicator according to one or more embodiments.

In this Figure, the portable lightweight low pressure soil treatment applicator 11 is connected to pressurized water for irrigation 202 for a home with a lawn and garden irrigation system, which is designed to irrigate predefined areas of soil 200*a* and 200*b*.

The pressurized water supply 202 can have a pressure from 50 psi to 70 psi.

Figure 2:
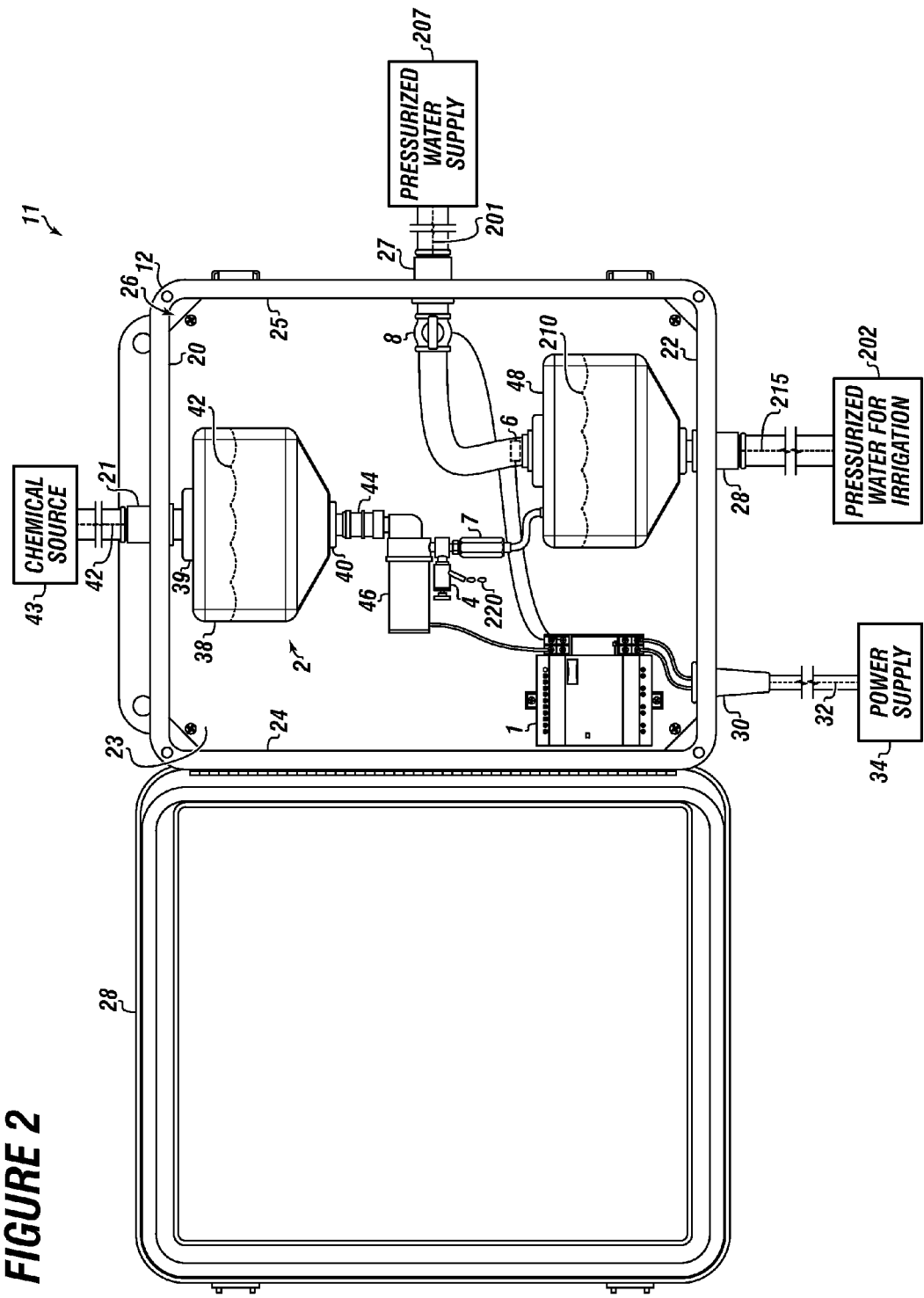
FIG. 2 is a front view of the portable lightweight low pressure soil treatment applicator.

FIG. 2 is a front view of the portable lightweight low pressure soil treatment applicator.

The portable lightweight low pressure soil treatment applicator 11 is shown having a housing 12.

The housing 12 has a top 20 with a chemical inlet port 21, a bottom 22 opposite the top, a back 23 between the top and the bottom, a first connected side 24 mounted between the top and the bottom, and a second connected side 25 mounted between the top and the bottom.

The top, bottom, back, first connected side and second connected side form a central cavity 26.

The housing 12 has a water inlet port 27 mounted through the top, the bottom, the back, or one of the connected sides of the housing.

The water inlet port 27 flows flow pressurized water 201 from the pressurized water supply 207 to the central cavity 26.

The housing 12 also has a diluted pressurized liquid soil treatment solution outlet port 28 mounted through either the top, the bottom, the back, or one of the connected sides of the housing to flow diluted pressurized liquid soil treatment solution 215 to the pressurized water for irrigation 202.

The housing 12 has a closable door 28 engaging the top, the bottom, and the connected sides, creating a weather resistant central cavity.

In embodiments, the closable door 28 can be a bi-fold door. In embodiments, the closable door can have two panels that open in the center. In embodiments, the closable door 28 can be a single hinged door and formed from a durable metal, such as steel.

The housing 12 has an electrical input 30 mounted through at least the top, the bottom, the back, or one of the connected sides of the housing.

The electrical input 30 receives power 32 from a power supply 34 external to the housing 12 and transfers the power 32 into the central cavity 26 for use by components contained and mounted in the central cavity.

The power supply can be 110 volts of AC from the grid or a solar farm.

In the housing and connected to the electrical inlet is a programmable logic circuit 1.

The housing 12 has a water valve 8 connected to the water inlet port 27. The water valve 8 is also connected to the programmable logic circuit 1.

A reservoir 2 is mounted in the central cavity and is fluidly connected to the chemical inlet port 21.

The reservoir can receive a liquid soil treatment solution 42 from a chemical source 43.

The chemical source 43 can be a tank holding the liquid soil treatment solution that is remote to the portable lightweight low pressure soil treatment applicator 11.

The reservoir has a container 38 for holding the received liquid soil treatment solution 42.

The container 38 can have a container inlet 39 for introducing the liquid soil treatment solution 42 to the container 38. In embodiments, the container can be made of lightweight plastic.

The container inlet 39 can be sealed when the portable lightweight low pressure soil treatment applicator 11 is not in use.

The container 38 can have a container outlet 40 for flowing received liquid soil treatment solution 42 from the container 38.

The housing 11 contains a suction check valve 44 fluidly connected to the container outlet 40.

A low pressure chemical pump 46 can be connected electronically to the programmable logic circuit 1 and the relay 104, shown in FIG. 3.

The low pressure chemical pump 46 is also fluidly connected to the suction check valve 44.

The low pressure chemical pump 46 increases pressure of the liquid soil treatment solution 42 to form a pressurized liquid soil treatment solution 210. The pressurized liquid soil treatment solution can have a pressure from 50 psi to 200 psi. The pressurized liquid soil treatment solution is at a pressure at least 10 percent greater than the pressure of the pressurized water supply 207.

A mixing chamber 48 in the housing 12 receives the pressurized liquid soil treatment solution 210 from the low pressure chemical pump 46 and mixes the pressurized liquid soil treatment with the pressurized water 201 from the water inlet port 27 diluting the pressurized liquid soil treatment solution 210 to a preset ratio established by a user that inputs ratios of water and liquid soil treatment into the programmable logic circuit 1.

The mixture forms the diluted pressurized liquid soil treatment solution 215 at the preset ratios established by the user.

A discharge check valve 7 is fluidly positioned between the mixing chamber 48 and the low pressure chemical pump 46. The discharge check valve 7 controls flow of the pressurized liquid soil treatment solution 210 to the mixing chamber.

The invention allows samples 220 to be pulled from the housing for analysis.

A sample valve 4 connected to the discharge check valve 7 enables the removal of samples 220 of the diluted pressurized liquid soil treatment solution 215 for chemical analysis such as chromatographic analysis or other chemical analysis.

The low pressure chemical pump 46 injects the diluted pressurized liquid soil treatment solution 215 at a pressure at least 10 percent greater than the pressure of the pressurized water for irrigation 202.

In embodiments, the portable lightweight low pressure soil treatment applicator uses a liquid soil treatment solution that is at least one of: a liquid herbicide, a liquid pesticide, a liquid fertilizer, and combinations thereof.

In embodiments, the portable lightweight low pressure soil treatment applicator has a reservoir with a capacity from 1 gallon to 10 gallons. In other embodiments, the reservoir can have a capacity up to 55 gallon capacity when the housing is a very large.

In embodiments, the portable lightweight low pressure soil treatment applicator can have a housing made from a chemical resistant polymer, such as polypropylene, polyethylene.

In an embodiment, the portable lightweight low pressure soil treatment applicator can weigh less than 10 pounds.

In an embodiment, the portable lightweight low pressure soil treatment applicator can have a height from 2 feet to 4 feet, a width from 2 feet to 4 feet and a length from 12 inches to 24 inches.

The portable lightweight low pressure soil treatment applicator 11 can also have a flow switch 6 in fluid communication with the water inlet port 27 as well as in electronic communication with the programmable logic circuit 1.

The flow switch 6 provides a signal to a relay 104 in the programmable logic circuit 1, which is shown in more detail in FIG. 3, to activate the low pressure chemical pump 46 when pressurized water enters the central cavity 26.

FIG. 3 is a diagram of the programmable logic circuit of the portable lightweight low pressure soil treatment applicator as connected to a network and a remote client device for remote control of the portable lightweight low pressure soil treatment applicator.

In embodiments, the programmable logic circuit 1 can be a computer. In other embodiments, the programmable logic circuit can be a minicomputer or a processor with data storage.

The programmable logic circuit 1 is shown with a ground fault interrupter 106 and a relay 104 for controlling power from the power supply of the portable lightweight low pressure soil treatment applicator.

The programmable logic circuit 1 has a processor 100 in communication with a data storage 102.

The data storage 102 can contain computer instructions 108 for activating and deactivating the relay when pressurized water is detected at the water inlet port.

The data storage 102 can contain computer instructions 109 to adjust flow rates of the diluted pressurized liquid soil treatment solution to the pressurized water for irrigation.

The data storage 102 can contain computer instructions 110 to provide the diluted pressurized liquid soil treatment solution at preset time intervals to the pressurized water for irrigation, such as every day at 7 pm.

The data storage 102 can contain computer instructions 112 to connect the programmable logic circuit to a network for controlling operation of the portable lightweight low pressure soil treatment applicator using a client device in communication with the network.

In embodiments, the network 206 can be the internet, another global communication network, a satellite network, a cellular network, a local area network, a wide area network or combinations of these networks or similar networks.

In embodiments, the client device 210 can a tablet computer, a smart phone, a smart watch, smart glasses, such as Google Glass™, a computer, a laptop, a wearable computer or a laptop. The client device can be a processor connected to data storage for receiving signals from the programmable logic circuit through the network and then displaying those results and signals to a user of the client device.

In embodiments, a phone application can be installed on the client device, which can monitor weather in the area of the portable lightweight low pressure soil treatment applicator and prevent the application of chemicals during a rainstorm automatically.

While these embodiments have been described with emphasis on the embodiments, it should be understood that within the scope of the appended claims, the embodiments might be practiced other than as specifically described herein.

What is claimed is:

1. A portable lightweight low pressure soil treatment applicator for a home, lawn or garden irrigation system with predefined areas of soil to be irrigated using a pressurized water supply and pressurized water for irrigation, wherein the portable lightweight low pressure soil treatment applicator comprising:

a. a housing comprising:
   (i) a top with a chemical inlet port;
   (ii) a bottom opposite the top;
   (iii) a back between the top and the bottom;
   (iv) a first connected side mounted between the top and the bottom;
   (v) a second connected side mounted between the top and the bottom;
   (vi) a central cavity in the housing between the connected top, the bottom, the back, the first connected side and the second connected side;
   (vii) a water inlet port mounted through at least one of: the top, the bottom, the back, the first connected side, and the second connected side of the housing to flow pressurized water from the pressurized water supply to the central cavity;
   (viii) a diluted pressurized liquid soil treatment solution outlet port mounted through at least one of: the bottom, the back, the first connected side, and the second connected side of the housing to flow diluted pressurized liquid soil treatment solution to the pressurized water for irrigation;
   (ix) a closable door engaging the top, the bottom, the first connected side, and the second connected side of the housing, creating a weather resistant central cavity; and
   (x) an electrical input mounted through at least one of: the top, the bottom, the back, the first connected side, or the second connected side of the housing, the electrical input is adapted to receive power from a power supply external to the housing and the electrical input transfers power into the central cavity;

b. a programmable logic circuit installed in the central cavity, comprising:
   (i) a relay for controlling power from the power supply;
   (ii) a processor;
   (iii) a data storage in communication with the processor; and
   (iv) computer instructions in the data storage for activating and deactivating the relay when pressurized water is detected at the water inlet port;

c. a reservoir in the central cavity fluidly connected to the chemical inlet port for receiving a liquid soil treatment solution from a chemical source, the reservoir comprising:
   (i) a container for holding the liquid soil treatment solution;
   (ii) a container inlet for introducing the liquid soil treatment solution to the container; and
   (iii) a container outlet for flowing the liquid soil treatment solution from the container;

d. a suction check valve fluidly connected to the container outlet;

e. a low pressure chemical pump electrically connected to the programmable logic circuit and fluidly connected to the suction check valve, the low pressure chemical pump increases pressure of the liquid soil treatment solution to form a pressurized liquid soil treatment solution, wherein the pressurized liquid soil treatment solution has a pressure which is at least 10 percent greater than the pressure of the pressurized water supply;

f. a mixing chamber for receiving the pressurized liquid soil treatment solution from the low pressure chemical pump, and for mixing with pressurized water from the water inlet port until the pressurized liquid soil treatment solution is diluted to a preset ratio forming the diluted pressurized liquid soil treatment solution; and g. a discharge check valve between the mixing chamber and the low pressure chemical pump for directionally controlling flow of the pressurized liquid soil treatment solution to the mixing chamber and preventing pressurized water from moving into the low pressure chemical pump; and wherein the mixing chamber passes the diluted pressurized liquid soil treatment solution at a pressure at least 10 percent greater than the pressure of the pressurized water supply into the pressurized water for irrigation.

2. The portable lightweight low pressure soil treatment applicator of claim 1, wherein the liquid soil treatment solution comprising at least one of: a liquid herbicide, a liquid pesticide, and a liquid fertilizer.

3. The portable lightweight low pressure soil treatment applicator of claim 1, wherein the reservoir has a capacity from 1 gallon to 55 gallons.

4. The portable lightweight low pressure soil treatment applicator of claim 1, wherein the housing comprises a chemical resistant polymer weighing less than 10 pounds and having a height from 2 feet to 4 feet, a width from 2 feet to 4 feet and length from 12 inches to 24 inches.

5. The portable lightweight low pressure soil treatment applicator of claim 1, further comprising computer instructions in the data storage to adjust flow rates of the diluted pressurized liquid soil treatment solution to the pressurized water for irrigation.

6. The portable lightweight low pressure soil treatment applicator of claim 1, further comprising computer instructions in the data storage to provide the diluted pressurized liquid soil treatment solution at preset time intervals to the pressurized water for irrigation.

7. The portable lightweight low pressure soil treatment applicator of claim 1, further comprising computer instructions in the data storage to connect the programmable logic circuit to a network for controlling operation of the portable lightweight low pressure soil treatment applicator using a client device in communication with the network.

8. The portable lightweight low pressure soil treatment applicator of claim 1, further comprising a flow switch in fluid communication with the water inlet port inside the housing and in electronic communication with the programmable logic circuit, wherein the flow switch provides a signal to the relay of the programmable logic circuit to activate the low pressure chemical pump when pressurized water enters the central cavity.

9. The portable lightweight low pressure soil treatment applicator of claim 1, further comprising a sample valve in fluid connection with an outlet of the low pressure chemical pump and before the discharge check valve, wherein the sample valve is for removing samples of the pressurized liquid soil treatment solution for chemical analysis.

10. The portable lightweight low pressure soil treatment applicator of claim 1, further comprising a water valve in the housing connected to the water inlet port and to the programmable logic circuit.

11. The portable lightweight low pressure soil treatment applicator of claim 1, wherein the programmable logic circuit further comprising a ground fault interrupter connected to the processor.

\* \* \* \* \*